(12) United States Patent
Muthiah

(10) Patent No.: US 11,543,987 B2
(45) Date of Patent: Jan. 3, 2023

(54) STORAGE SYSTEM AND METHOD FOR RETENTION-BASED ZONE DETERMINATION

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 47 days.

(21) Appl. No.: 16/893,033

(22) Filed: Jun. 4, 2020

(65) Prior Publication Data
US 2021/0382643 A1    Dec. 9, 2021

(51) Int. Cl.
*G06F 3/06* (2006.01)

(52) U.S. Cl.
CPC ............ *G06F 3/0644* (2013.01); *G06F 3/064* (2013.01); *G06F 3/0616* (2013.01); *G06F 3/0673* (2013.01)

(58) Field of Classification Search
CPC ...... G06F 3/0644; G06F 3/064; G06F 3/0673; G06F 3/0616
See application file for complete search history.

(56) References Cited

U.S. PATENT DOCUMENTS

| | | |
|---|---|---|
| 8,127,048 B1 | 2/2012 | Merry et al. |
| 9,846,554 B1 | 12/2017 | Lai et al. |
| 2005/0198002 A1* | 9/2005 | Ito .................... G06F 11/167 |
| 2007/0116070 A1* | 5/2007 | Schulte .............. H01S 5/02326 |
| | | 372/50.12 |
| 2011/0099460 A1* | 4/2011 | Dusija ................ G11C 16/3495 |
| | | 711/E12.001 |
| 2012/0284587 A1* | 11/2012 | Yu ....................... G06F 12/0868 |
| | | 711/E12.008 |
| 2013/0073785 A1* | 3/2013 | Emma ................ G06F 12/0238 |
| | | 711/103 |
| 2016/0062696 A1* | 3/2016 | Cerrelli ................ G06F 3/0604 |
| | | 711/202 |
| 2016/0062881 A1 | 3/2016 | Chen et al. |
| 2016/0092120 A1* | 3/2016 | Liu ....................... G06F 3/0688 |
| | | 711/103 |
| 2016/0103630 A1* | 4/2016 | Shen .................... G06F 3/0616 |
| | | 714/37 |
| 2016/0188455 A1 | 6/2016 | Patel |
| 2017/0060461 A1 | 3/2017 | Erez et al. |
| 2017/0116070 A1* | 4/2017 | Alrod .................... G11C 16/26 |
| 2018/0188956 A1* | 7/2018 | Cr ......................... G06F 3/0659 |
| 2019/0027193 A1 | 1/2019 | Yuan et al. |

(Continued)

OTHER PUBLICATIONS

Picoli et al., Open-Channel SSD (What is it Good for), Jan. 12-15, 2020, CIDR,8 pages (Year: 2020).*

(Continued)

*Primary Examiner* — Gary W. Cygiel
(74) *Attorney, Agent, or Firm* — Crowell & Moring LLP

(57) ABSTRACT

A storage system and method for retention-based zone determination are provided. In one embodiment, a storage system is presented comprising a memory comprising a plurality of blocks and a controller. The controller is configured to receive, from a host, a zone-create command comprising a health requirement; and in response to receiving the zone-create command, create a zone of memory from blocks of the memory that satisfy the health requirement. Other embodiments are provided.

20 Claims, 6 Drawing Sheets

(56) References Cited

U.S. PATENT DOCUMENTS

| | | | |
|---|---|---|---|
| 2019/0042106 A1* | 2/2019 | Klein | G06F 3/0647 |
| 2019/0121725 A1* | 4/2019 | Sehgal | G06F 12/0246 |
| 2019/0138226 A1* | 5/2019 | Kanno | G06F 12/16 |
| 2020/0081834 A1* | 3/2020 | Desai | G06F 3/0644 |
| 2020/0125261 A1* | 4/2020 | Byun | G06F 3/0604 |
| 2021/0019083 A1* | 1/2021 | Guo | G06F 11/1076 |

OTHER PUBLICATIONS

International Search Report completed May 13, 2021 for International Application No. PCT/US2021/016226.

Written Opinion completed May 13, 2021 for International Application No. PCT/US2021/016226.

Israel Patent Office Search Strategy completed May 13, 2021 for International Application No. PCT/US2021/016226.

"NVMe Zoned Namespaces"; Zoned storage support introduction website page; downloaded from the Internet at https://zonedstorage.io/introduction/zns/ on Apr. 16, 2020; 2 pages.

Mellor, C.; "Zoned SSDs live fast, die old, Western Digital claims"; downloaded from the Internet at https://blocksandfiles.com/2019/03/27/disk-shingling-scheme-driving-zoned-ssd-developments/ on Apr. 16, 2020; published Mar. 27, 2019; 4 pages.

Bjøhmg, M.; "New NVMe™ Specification Defines Zoned Namespaces (ZNS) as Go-To Industry Technology—NVM Express"; NVM Express blog page; downloaded from the Internet at https://nvmexpress.org/new-nvmetm-specification-defines-zoned-namespaces-zns-as-go-to-industry-technology/ on Apr. 16, 2020; 4 pages.

Campello DeSouza, J.; "What is Zoned Storage and the Zoned Storage Initiative?" Western Digital blog page; downloaded from the Internet at https://blog.westerndigital.com/what-is-zoned-storage-initiative/ on Apr. 16, 2020; 12 pages.

* cited by examiner

ND METHOD FOR
STORAGE SYSTEM AND METHOD FOR RETENTION-BASED ZONE DETERMINATION

BACKGROUND

A host and storage system can operate under a standard, such as the Non-Volatile Memory Express (NVMe) standard. One feature of the NVMe standard is Zoned Namespace (ZNS). A Zoned Namespace divides the logical address space of a memory into zones. Each zone, which can be in a single memory die or span several memory dies, provides a logical block address (LBA) range that must be written sequentially and must be erased/reset before it can be written into again. Such zones reduce write amplification, overprovisioning, and internal controller memory usage, while improving throughput and latency. The host manages the creation and use of zones, and the storage system can have parallel input/output (I/O) queues to handle reads and writes into the zones. Different applications on the host can direct I/Os to different zones, which can be dedicated to storing different types of data (e.g., music, video, images), so that the usage pattern for the data in any given zone is constant and predictable.

DETAILED DESCRIPTION

Overview

Figure 1A:
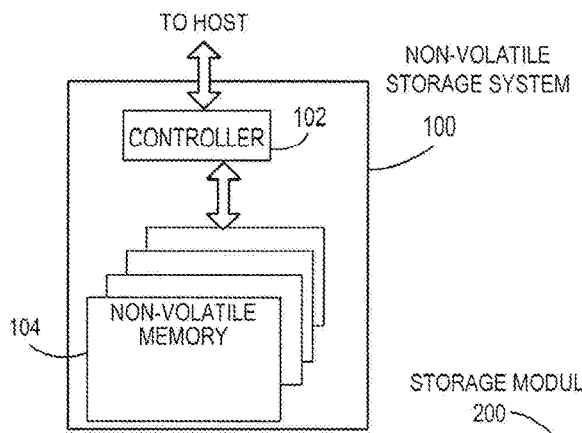
FIG. 1A is a block diagram of a non-volatile storage system of an embodiment.

By way of introduction, the below embodiments relate to a storage system and method for retention-based zone determination. In one embodiment, a storage system is presented comprising a memory comprising a plurality of blocks and a controller. The controller is configured to: receive, from a host, a zone-create command comprising a health requirement; and in response to receiving the zone-create command, create a zone of memory from blocks of the memory that satisfy the health requirement.

In some embodiments, the memory comprises a plurality of dies, each comprising a respective plurality of blocks, and wherein the controller is further configured to create the zone of memory from blocks across multiple dies.

In some embodiments, the blocks of the memory satisfy the health requirement in response to an average health of the blocks of the memory satisfying the health requirement.

In some embodiments, each of the plurality of blocks is associated with a health index.

In some embodiments, health of a block is determined from one or more of the following: age of the block, a number of program/erase cycles of the block, syndrome weight of the block, bit error rate of the block, an enhanced post-write read factor of the block, and a last read low-density parity check state of the block.

In some embodiments, the controller is further configured to provide an indication of health of the plurality of blocks to the host prior to receiving the zone-create command.

In some embodiments, the controller is further configured to provide an indication of health of the plurality of blocks to the host as an update after receiving the zone-create command.

In some embodiments, the controller is further configured to receive, from the host, identification of the blocks of the memory that satisfies the health requirement.

In some embodiments, the controller is further configured to write data sequentially in a zone.

In some embodiments, the controller is further configured to overwrite data in a zone only after erasing the zone.

In some embodiments, the memory comprises a three-dimensional memory.

In another embodiment, a method is provided that is performed in a host in communication with a storage system comprising a memory, wherein the memory comprises a plurality of regions, each region being associated with a data retention ability. The method comprises receiving, from the storage system, information about the data retention abilities of the plurality of regions; determining a data retention requirement; identifying a set of regions of the memory that satisfy the data retention requirement; and sending a request to the storage system to create a zone of memory from the set of regions.

In some embodiments, the method further comprises sending a request to the storage system for the information about the data retention abilities of the plurality of regions.

In some embodiments, the data retention requirement is specified by an application running on the host.

In some embodiments, the memory comprises a plurality of dies, and wherein the set of regions comprises regions across multiple dies.

In some embodiments, a region's data retention ability is determined from one or more of the following: age of the region, a number of program/erase cycles of the region, syndrome weight of the region, bit error rate of the region, an enhanced post-write read factor of the region, and a last read low-density parity check state of the region.

In another embodiment, a storage system is provided comprising a memory; means for receiving, from a host, a zone-create command comprising a health requirement; and means for, in response to receiving the zone-create command, creating a zone of memory from parts of the memory that satisfy the health requirement.

In some embodiments, the memory comprises a plurality of dies, and wherein the zone is created from parts of multiple dies.

In some embodiments, health of a part of the memory is determined from one or more of the following: age, a number of program/erase cycles, syndrome weight, bit error rate, an enhanced post-write read factor, and a last read low-density parity check state.

In some embodiments, the zone-create command identifies the parts of the memory that satisfy the health requirement.

Other embodiments are possible, and each of the embodiments can be used alone or together in combination. Accordingly, various embodiments will now be described with reference to the attached drawings.

Embodiments

Figure 1B:
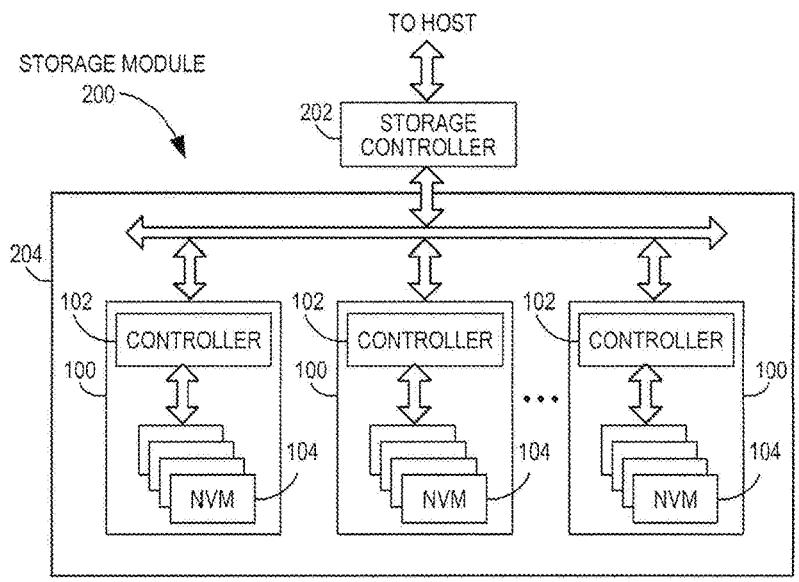
FIG. 1B is a block diagram illustrating a storage module of an embodiment.
Figure 1C:
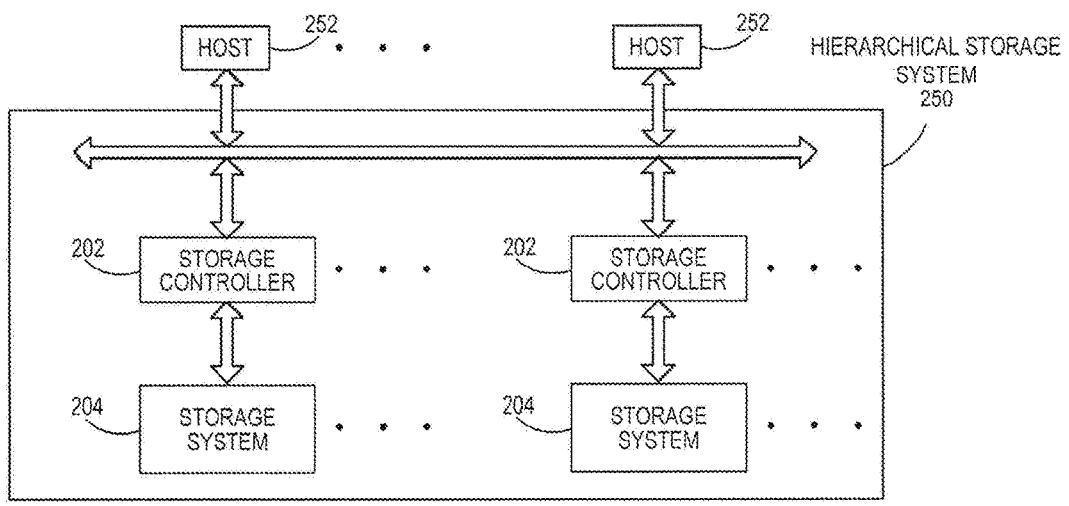
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
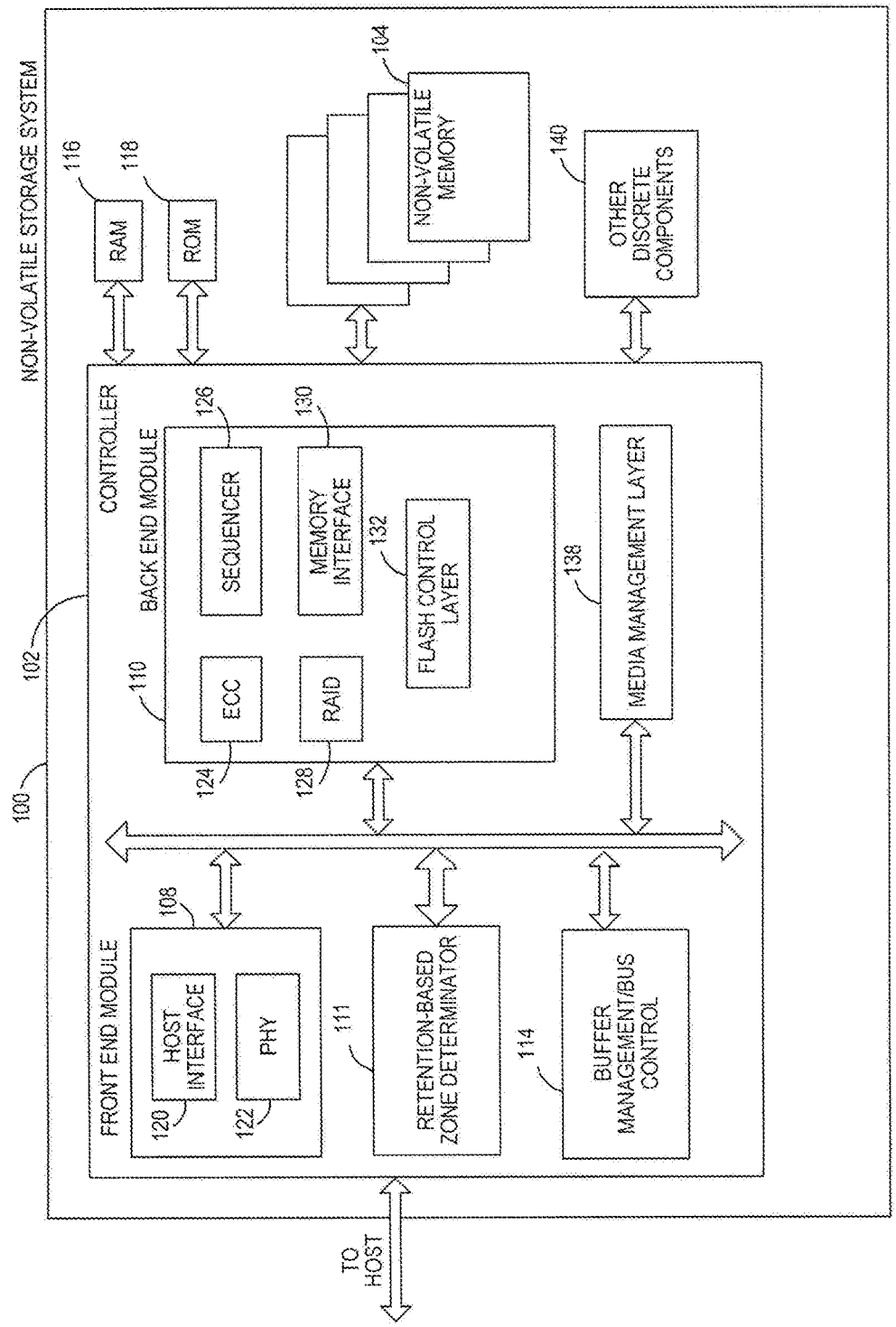
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a retention-based zone determinator 111, which will be discussed in more detail below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
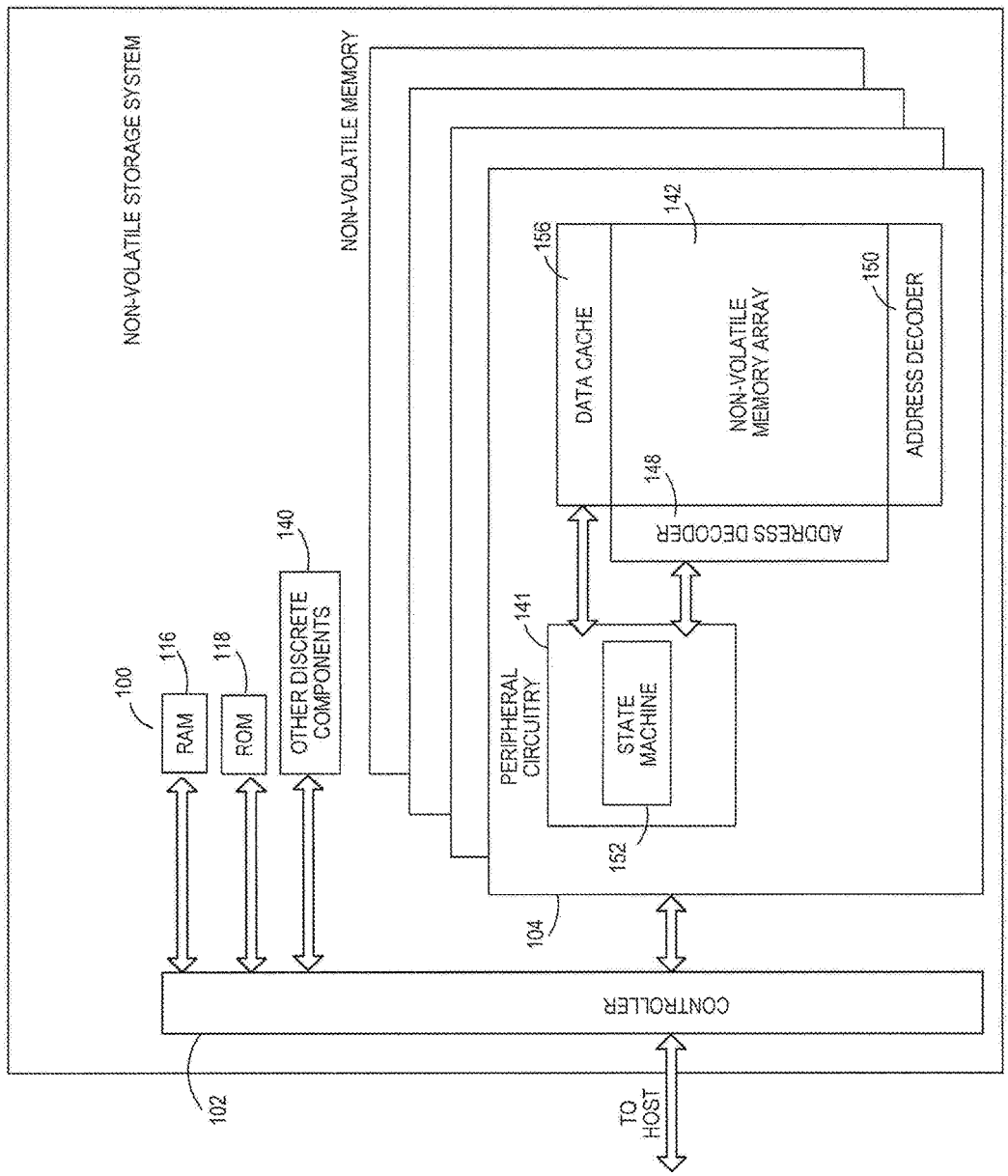
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
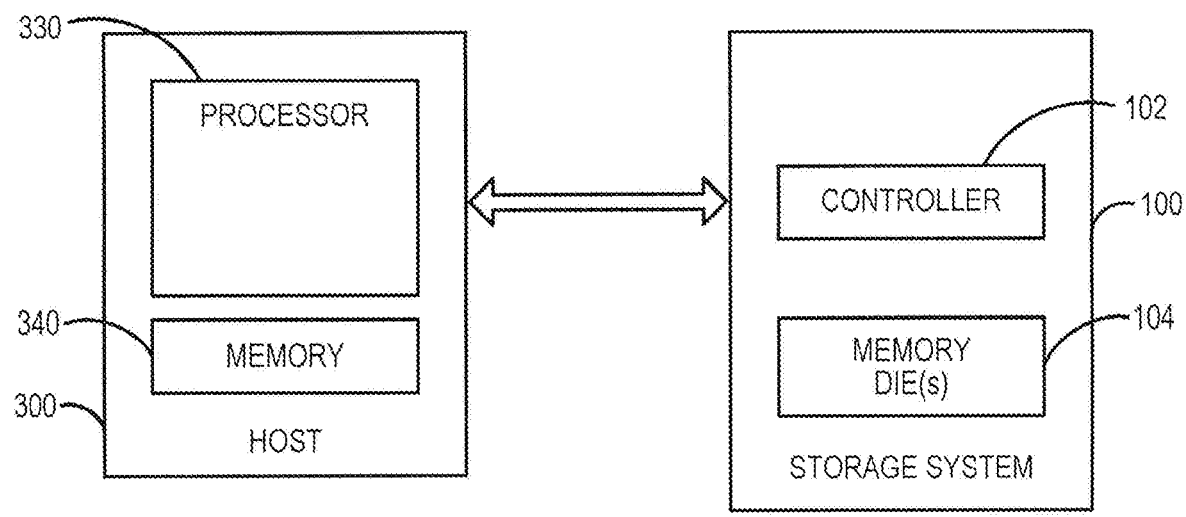
FIG. 3 is a block diagram of a host and storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to playback media read from the memory 104 of the storage system 100.

As mentioned above, a host and storage system can operate under a standard, such as the Non-Volatile Memory Express (NVMe) standard. One feature of the NVMe standard is Zoned Namespace (ZNS). A Zoned Namespace divides the logical address space of a memory into zones. Each zone, which can be in a single memory die or span several memory dies, provides a logical block address (LBA) range that must be written sequentially and must be erased/reset before it can be written into again. Such zones reduce write amplification, overprovisioning, and internal controller memory usage, while improving throughput and latency. Zones are formed from physical blocks, and the zones are mapped from physical blocks to logical blocks. The use of zones minimizes the logical-to-physical (L2P) address mapping overhead, as every zone has a L2P entry of only four bytes (two bits for the zone type, and 20 bits for the physical address). The host manages the creation and usage of zones, and the storage system can have parallel input/output (I/O) queues to handle reads and writes into the zones. Different applications on the host can direct I/Os to different zones, which can be dedicated to storing different types of data (e.g., music, video, images), so that the usage pattern for the data in any given zone is constant and predictable.

The following embodiments can be used to leverage zones to optimize data routing of various applications. For example, NVMe hosts typically use a health metric to map logical addresses against performance managed at an endurance group level. ZNS is a namespace within the NVMe set, which itself is within an endurance group. This puts an entire ZNS zone under one endurance group, but multiple applications can access it for data of different types. In one embodiment discussed below, zone-based health mapping is used. In addition, in typical storage systems, there is flexible writing and L2P management, which results in more write amplification. Flexible L2P necessarily means that any logical data can go to any physical location. For example, with 768 kilobytes (KB) of logical data, 256 KB can potentially go to a healthier block, 256 KB can go to a weaker block, and 256 KB can go to an average block. A zone can potentially be created out of any physical blocks not consistent with each other.

In one embodiment, the host 300 (which will sometimes be referred to herein as a ZNS host) sends a zone-create command to the storage system 100 with a zone health requirement (e.g., 1 to 10). The storage system 100 (which will sometimes be referred to herein as a ZNS device) responds by creating a zone from different physical blocks (possibly across multiple die groups) of similar health matching the requested host requirement for a best fit. The host 100 then uses the created zones in the memory 104 to appropriately stream different application data into different logical areas based on its own data retention requirement table. Although the logical-to-physical mapping in a zone is not permanent, expensive zone rewrites can be avoided at an early point. A zone can still be formed from new physical erase blocks and/or relinked blocks, but that may require relocating existing data, which is an overhead.

There are several advantages associated with these embodiments. For example, these embodiments can be used to enable seamless streaming of data based on retention requirements. By leveraging the ZNS feature, these embodiments can optimize data routing of various applications, which may be especially desirable in quad-level cell (QLC) memories, which have relatively-poor retention. Also, these embodiments can reduce device-side rewrites (e.g., wear levelling due to a mismatch in block usage during zone formation, which is not a host write), which is an important motivation of the ZNS feature.

Figure 4:
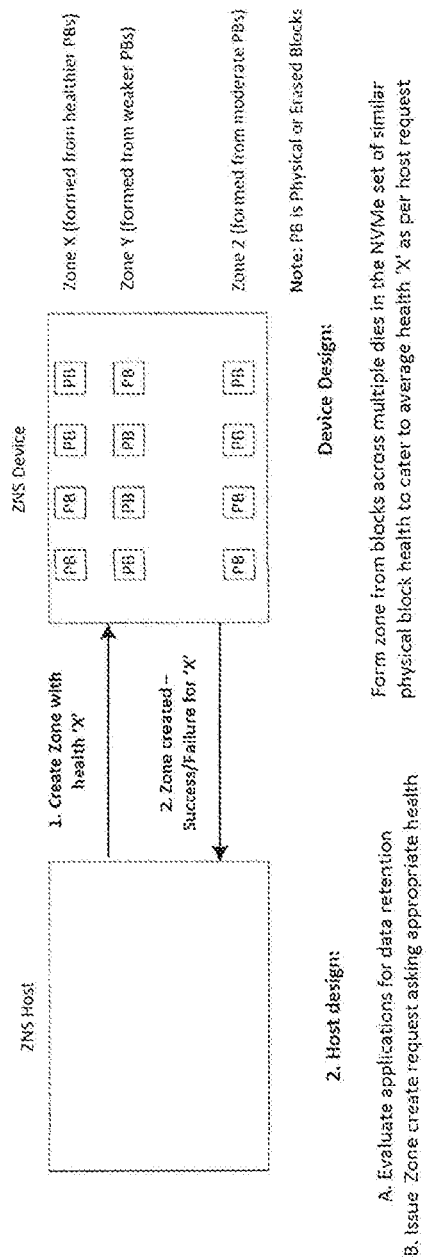
FIG. 4 is a block diagram illustrating communication between a host and storage system of an embodiment.

Turning again to the drawings, FIG. 4 is a block diagram that illustrates one example of this embodiment. As shown in FIG. 4, the ZNS host evaluates the applications running on the host for their data retention requirements. The ZNS host then sends a zone-create command to the ZNS storage device with a health (protection/retention) requirement ("health 'x'") needed to support the needed data retention. In response to receiving the zone-create command, the ZNS storage device creates a zone of memory from blocks of the memory (from one or multiple dies) that satisfy the health requirement. To determine if a block satisfies the health requirement, the ZNS device can look at the average health of the blocks that make up the zone. The health of a given block can be specified by a health index value, which can be determined from one or more of the following: age of the block, a number of program/erase cycles of the block, syndrome weight of the block, bit error rate of the block, an enhanced post-write read factor of the block, and a last read low-density parity check state of the block. The ZNS device may classify zones on a health basis and relink to call out a particular zone (logical address range) as strong or weak.

The ZNS device can provide an indication of health of the plurality of blocks to the ZNS host prior to receiving the zone-create command, so the host will know the range of health indexes to choose from. In this way, the ZNS host can maintain the zone classification and maps with its retention requirement to decide on routing. As the health of the blocks can change over time, the ZNS device can send an update to the ZNS host regarding the current health of the blocks (e.g., after receiving the zone-create command). In either situation, the ZNS host can provide the ZNS device with an identification of the blocks of the memory that satisfies the health requirement. Alternatively, the host may decide not to use this embodiment and just use a standard zone-create request.

It should be noted that while blocks were associated with a "health requirement" or "health index" in the above example, the blocks can instead be associated with a metric that corresponds to its data retention ability: That way, when a host determines the data retention requirement it needs for one if its applications, it can identify a set of regions in the device's memory that satisfy the data retention requirement and request that a zone be created from those regions.

Figure 5:
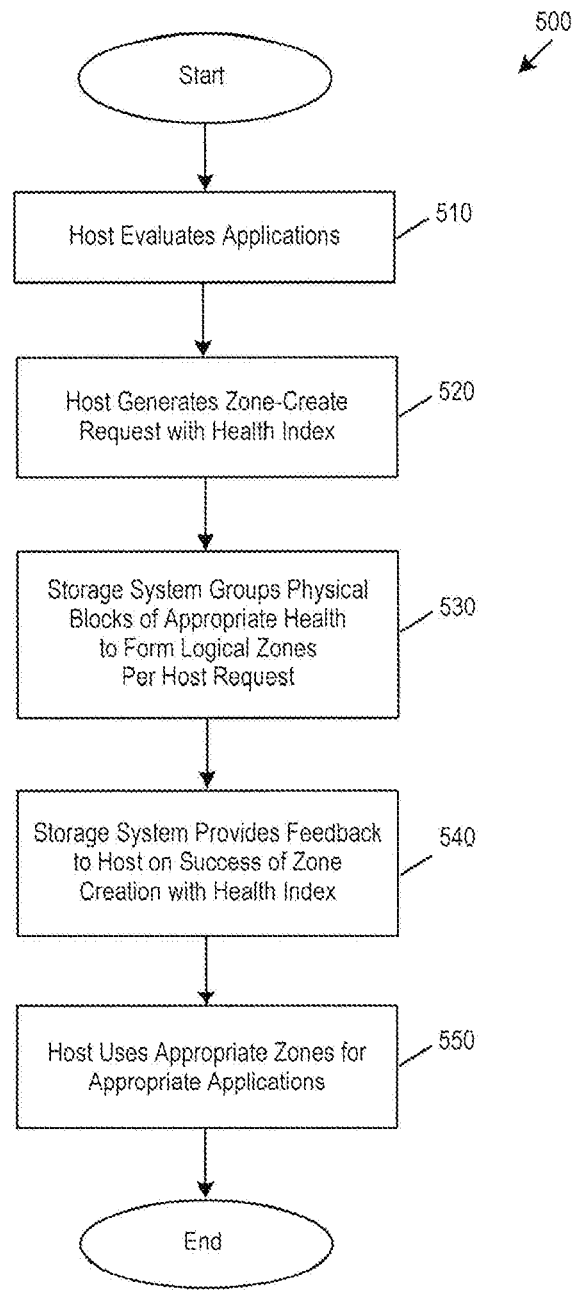
FIG. 5 is a flow chart of a method of an embodiment for retention-based zone determination.

Turning again to the drawings, FIG. 5 is a flow chart 500 of a method of an embodiment for retention-based zone determination. As shown in FIG. 5, the host first evaluates its applications for their data retention/health requirements (act 510). Next, the host generates a zone-create request with a health index (act 520). The storage system then groups together physical blocks of the appropriate health to form logical zones per the host's request (act 530). Then, the storage system provides feedback to the host on the success of the zone creation (act 540). Finally, the host uses the appropriate zones for the appropriate applications (act 550).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:
1. A storage system comprising:
a memory comprising a plurality of blocks; and
a controller configured to:
provide a host in communication with the storage system with a health index value of each block of the plurality of blocks;
in response to receiving, from the host, a first zone-create command identifying a first set of blocks from the plurality of blocks that have a health index value that matches a data retention health requirement of a first application on the host, create a first zone of memory from the identified first set of blocks of the memory;
in response to receiving, from the host, a second zone-create command identifying a second set of blocks from the plurality of blocks that have a health index value that matches a data retention health requirement of a second application on the host, create a second zone of memory from the identified second set of blocks of the memory, wherein the first zone and the second zone are dedicated to different types of data and comprise respective logical address ranges that must be written sequentially and erased before being written again; and
provide the host with an updated health index value of each block of the plurality of blocks.

2. The storage system of claim 1, wherein:
the memory comprises a plurality of dies, each die comprising a respective plurality of blocks; and
the controller is further configured to create at least one of the first zone and the second zone from blocks across multiple dies.

3. The storage system of claim 1, wherein the health index value of a block comprises an average of a plurality of health values of the block taken over time.

4. The storage system of claim 1, wherein the health index value of a block is determined from an age of the block.

5. The storage system of claim 1, wherein the memory comprises a three-dimensional memory.

6. The storage system of claim 1, wherein the controller is further configured to use a plurality of input-output queues for parallel accessing of the first zone and the second zone.

7. The storage system of claim 1, wherein:
the controller is further configured to create a logical-to-physical address entry for each zone of the first zone and the second zone; and
the logical-to-physical address entry of each zone of the first zone and the second zone comprises a first set of bytes for a zone type and a second set of bytes for a physical address.

8. The storage system of claim 1, wherein the first zone and the second zone are within an endurance group of the memory.

9. The storage system of claim 1, wherein the health index value of a block is determined from a number of program/erase cycles of the block.

10. The storage system of claim 1, wherein the health index value of a block is determined from a syndrome weight of the block.

11. The storage system of claim 1, wherein the health index value of a block is determined from a bit error rate of the block.

12. The storage system of claim 1, wherein the health index value of a block is determined from an enhanced post-write read factor of the block.

13. The storage system of claim 1, wherein the health index value of a block is determined from a last read low-density parity check state of the block.

14. A method comprising;
performing the following in a host in communication with a storage system comprising a memory, wherein the memory comprises a plurality of blocks:
receiving, from the storage system, a health index value of each block of the plurality of blocks;
determining data retention requirements of a first application and a second application running on the host;
identifying a first set of blocks from the plurality of blocks that have a health index value that matches the data retention health requirement of the first application;
identifying a second set of blocks from the plurality of blocks that have a health index value that matches the data retention health requirement of the second application;
sending a first request to the storage system to create a first zone of memory from the first set of blocks;
sending a second request to the storage system to create a second zone of memory from the second set of blocks, wherein each zone of the first zone and the second zone comprises a respective logical address range that must be written sequentially and erased before it can be written again; and
receiving, from the storage system, an updated health index value of each block of the plurality of blocks.

15. The method of claim 14, further comprising sending a request to the storage system for the health index value of each block of the plurality of blocks.

16. The method of claim 14, wherein the memory comprises a plurality of dies, and wherein at least one zone of the first zone and the second zone is created from blocks across multiple dies.

17. The method of claim 14, wherein a block's health index value is determined from one or more of the following: an age of the block, a number of program/erase cycles of the block, a syndrome weight of the block, a bit error rate of the block, an enhanced post-write read factor of the block, and a last read low-density parity check state of the block.

18. The method of claim 14, further comprising:
sending a request to the storage system to create an additional zone, wherein an application running on the host selects whether to store data in the first zone, in the second zone, or in the additional zone based on a data retention requirement.

19. The method of claim 14, further comprising:
sending a request to the storage system to create an additional zone, wherein the first zone, the second zone, and the additional zone are used to store different types of data.

20. A storage system comprising:
a memory comprising a plurality of blocks;
means for providing a host in communication with the storage system with a health index value of each block of the plurality of blocks;
means for creating a first zone of memory from a first set of blocks of the memory in response to receiving, from the host, a first zone-create command identifying the first set of blocks that have a health index value that matches a data retention health requirement of a first application on the host;
means for creating a second zone of memory from a second set of blocks of the memory in response to receiving, from the host, a second zone-create command identifying the second set of blocks that have a health index value that matches a data retention health requirement of a second application on the host, wherein the first zone and the second zone are dedicated to different types of data and comprise respective logical address ranges that must be written sequentially and erased before being written again; and
means for providing the host with an updated health index value of each block of the plurality of blocks.

* * * * *